(12) United States Patent
Milnes et al.

(10) Patent No.: US 10,054,696 B2
(45) Date of Patent: Aug. 21, 2018

(54) DETECTOR FOR AN ELECTRON MULTIPLIER

(71) Applicant: Photek Limited, East Sussex (GB)

(72) Inventors: James Milnes, East Sussex (GB); Tom Conneely, East Sussex (GB); Jonathan Lapington, East Sussex (GB)

(73) Assignee: Photek Limited, Sussex (GB)

( * ) Notice: Subject to any disclaimer, the term of this patent is extended or adjusted under 35 U.S.C. 154(b) by 222 days.

(21) Appl. No.: 15/186,271

(22) Filed: Jun. 17, 2016

(65) Prior Publication Data

US 2016/0370476 A1    Dec. 22, 2016

(30) Foreign Application Priority Data

Jun. 19, 2015  (GB) .................................. 1510859.0

(51) Int. Cl.
*G01T 1/29* (2006.01)
*H01J 31/49* (2006.01)
*H01J 43/12* (2006.01)

(52) U.S. Cl.
CPC ............ *G01T 1/2935* (2013.01); *H01J 31/49* (2013.01); *H01J 43/12* (2013.01)

(58) Field of Classification Search
CPC .......... G01T 1/248; G01T 1/1645; H01J 1/00
See application file for complete search history.

(56) References Cited

U.S. PATENT DOCUMENTS

| 5,493,111 A | 2/1996 | Wheeler |
| 5,686,721 A | 11/1997 | Schmidt-Bocking |
| 2008/0283725 A1* | 11/2008 | Hahn ..................... H01J 47/02 250/207 |
| 2011/0276526 A1* | 11/2011 | Turbin ..................... G01T 1/28 706/17 |
| 2014/0239185 A1* | 8/2014 | de Oliveira ........... G01T 1/2935 250/374 |

FOREIGN PATENT DOCUMENTS

| EP | 0651233 A1 | 5/1995 |
| EP | 2634790 A2 | 9/2013 |

OTHER PUBLICATIONS

UK Intellectual Property Office, Search Report for Application No. GB1510859.0, dated Jan. 27, 2016.

* cited by examiner

*Primary Examiner* — Yara B Green
(74) *Attorney, Agent, or Firm* — Socal IP Law Group LLP; Mark A. Goldstein

(57) ABSTRACT

A detector for an electron multiplier comprising: a substrate comprising a dielectric material, the substrate having a first face and an opposing second face; a charge collector provided adjacent the first face of the substrate; an anode within the substrate, the anode spaced from first face, such that the anode is capacitively coupled to the charge collector, so that charge incident on the charge collector generates an image charge on the anode; and a conduit contact, coupled to the anode and passing through the substrate to the second face of the substrate layer.

18 Claims, 1 Drawing Sheet

DETECTOR FOR AN ELECTRON MULTIPLIER

RELATED APPLICATION INFORMATION

This application is based on and claims the benefit of priority from UK Patent Application No. GB 1510859.0, filed on Jun. 19, 2015, the content of which is incorporated herein by reference.

BACKGROUND

A detector, namely a detector for an electron multiplier and an electron multiplier comprising the electron detector, is disclosed herein.

Electron multipliers can be used to detect the presence of single electrons or other quanta or particles. FIG. 2 shows a cut-through view of an electron multiplier 200 according to the prior art.

Generally, an electron multiplier 200 comprises a chamber 202 defined by side walls 204, a front cover 206 and a rear cover 208. The front cover 206 is transparent to the quanta or particle that the multiplier 200 is designed to detect.

The chamber 202 is held under a vacuum, and contains an electron avalanche mechanism 210. A single electron 212 incident on the front face of the avalanche mechanism 210 is absorbed and causes an electron avalanche 214 to be emitted from the rear face.

Electron multipliers 200 can be used to directly detect incident electrons, quanta or other particles. The avalanche mechanism 210 may initiate an electron avalanche in response to the absorption of an electron, quanta or other particle. For example, an electron avalanche may be initiated in response to absorption of electrons, positively or negatively charged ions or photons.

Alternatively, as shown in FIG. 2, the electron multiplier 200 may comprise a converter 216. The converter 216 absorbs an incident quanta or particle 218 (such as a photon or ion) on its front face, and emits a single electron 212 from its rear face. In this case, the electron multiplier 200 detects an electron which is representative of the incident quanta or particle.

In the example shown in FIG. 2, a single photon 218 is absorbed by the converter 216, which emits a single electron 212. The single electron 212 is then absorbed by the avalanche mechanism 210, which emits an electron avalanche 214.

The electron avalanche 214 is detected by a sensor (not shown in FIG. 2), provided after the avalanche mechanism 210. It is known, for example, to provide the sensor within the chamber 202, having electrical connects provided though the side walls 204 or rear cover 208. This can be used to detect the present of quanta or particles and, for example, count the number of quanta and particles.

The electron multiplier 200 may be provided on its own, such that the outside of the side walls 204, front cover 206 and rear cover 208 is open to atmospheric conditions.

The electron multiplier 200 could also be coupled to a larger vacuum system. In examples where the electron multiplier is coupled to a larger vacuum system, the electron multiplier may be held within the larger vacuum or adjacent a housing forming the larger vacuum (the housing defining the larger vacuum should include a window transparent to the quanta or particle to be detected aligned with the front cover 206 of the electron multiplier).

In another example where the electron multiplier 200 is coupled to a larger vacuum, the chamber 202 may be formed as part of the larger vacuum, with the front cover 206 omitted, and the sidewalls 204 joining directly to the housing defining the larger vacuum.

Any suitable technique can be used to couple the electron multiplier to the larger vacuum.

Avalanche mechanisms 210, converters 216 and electron multipliers 200 of this type are generally well known in the art. However, the electrical connections through the side walls 204 make the sensor difficult to implement. Also, in some applications, it may be important to know the position of detected quanta or particles.

To detect the position of the quanta or particle 218, the electron multiplier 200 should preserve position throughout the multiplier 200. Therefore, at the avalanche mechanism 210 the electron avalanche 214 is emitted from the same (two dimensional) position as where the incident electron 212 is absorbed. Similarly, at the converter 216, the single electron 212 should be emitted from the same (two-dimensional) position as where the incident quanta or particle 218 is absorbed.

Because the avalanche mechanism 210 (and converter) preserve the position of the incident quanta or particle 218, it is possible to determine the position at which the incident quanta or particle 218 over the face of the electron multiplier 200 by determining the position of the electron avalanche 214.

The electron avalanche 214 is first collected for a short time inside the vacuum via a high-resistance collector. The electron avalanche is then read out capacitively as an image charge, through the rear cover 208. This is done via a low-resistance anode layer, outside the chamber 202.

The anode layer comprises a plurality of contact regions. The image charge spreads as it capacitively couples through the counter-substrate, so the image charge is incident on more than one of the contact regions. The position of the incident electron can be determined by processing the charges induced on the different contact regions (also known as "centroiding").

U.S. Pat. No. 5,686,721 is one example of a sensor that can be used for determining the position of an incident electron.

Two events (detection of quanta 218) will be considered simultaneous, or near-simultaneous, if they result in image charges incident on one or more of the contact regions at the same time. If simultaneous or near-simultaneous events induce image charges in one or more of the same contact regions, centroiding is not able to determine the two separate events. Instead, the two induced charges are interpreted as a single event, with a position derived from treating the two induced image charges as a single image charge. Therefore, centroiding is limited to serial events (i.e. one after another) for events in close proximity and cannot be used to detect simultaneous or near-simultaneous events.

According to a first aspect of the disclosure, there is provided a detector for an electron multiplier, the detector comprising: a substrate comprising a dielectric material, the substrate having a first face and an opposing second face; a charge collector provided adjacent the first face of the substrate; an anode within the substrate, the anode spaced from first face, such that the anode is capacitively coupled to the charge collector, so that charge incident on the charge collector generates an image charge on the anode; and a conduit contact, coupled to the anode and passing through the substrate to the second face of the substrate layer.

Burying the anode within the substrate means that the image charge spreads less before being detected, without having to provide electrical connections all the way through the rear wall. As such, there is less chance of two simultaneous or near-simultaneous events occurring in close proximity to one another inducing image charges on a common contact of the anode, improving the resolution of the detector.

The substrate may comprise a dielectric layer forming the first face. The anode may be provided within the dielectric layer or at the edge of the dielectric layer.

The substrate may comprise a ceramic layer forming the second face. The anode may be provided at the interface between the ceramic layer and the dielectric layer.

The spacing between the first face of the substrate and the anode may be at most 1 mm.

The conduit contact may comprise a via portion passing through the substrate and a planar portion, on the second face of the substrate.

The detector may further comprise circuitry, coupled to the conduit contact. The circuitry may be arranged to read-out the image charge induced in the anode and may comprise a processor arranged to determine the position of an electron avalanche incident on the charge collector, based on the detected charge.

The anode may comprise a plurality of electrically isolated anode plates. Each anode plate may be coupled to a separate conduit contact and the circuitry may be arranged to separately readout the image charge from each anode plate.

The circuitry may be arranged to readout the charge induced in at least two anode plates simultaneously.

The processor may be arranged to compare the image charge simultaneously induced in neighboring anode plates and to determine the position of an electron avalanche incident on the charge collector based on the comparison.

The charge collector may be a resistive layer. The resistive layer may have a sheet resistance of at least 250 kohm/square. The resistive layer may have a sheet resistance of 500 kohm/square; 750 kohm/square or 1 Mohm/square.

According to a second aspect of the disclosure, there is provided an electron multiplier comprising means for initiating an electron avalanche in response to a single detected electron, the electron avalanche emitted in the same location as the single electron is detected; and a detector, according to the first aspect, for detecting the electron avalanche and determining the position of the single electron from the detected position of the electron avalanche.

The electron multiplier may comprise a measurement chamber holding the means of initiating an electron avalanche in a vacuum. The chamber may be defined by a housing, the substrate forming at least part of the housing, such that the charge collector is held in the vacuum and the second face of the substrate is held outside the vacuum.

The electron multiplier may further comprise an electron converter having a first face and an opposing second face, the electron converter, arranged to receive a photon or other quanta at a first location on the first face, and, in response to a received photon or quanta, emit an electron from the first location on the second face, the electron emitted towards the means for initiating an electron avalanche.

DETAILED DESCRIPTION

Figure 1:
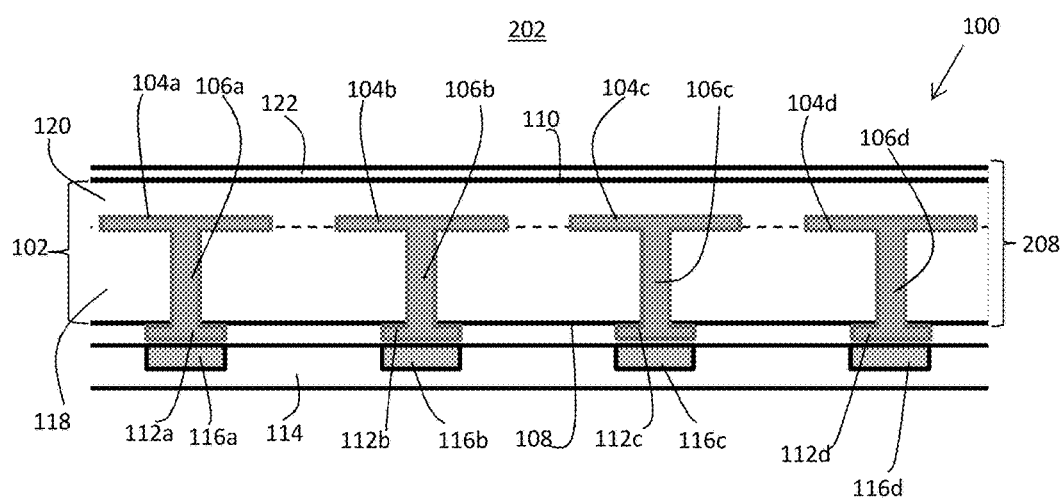
FIG. 1 is a schematic representation a detector for an electron multiplier as described herein.
Figure 2:
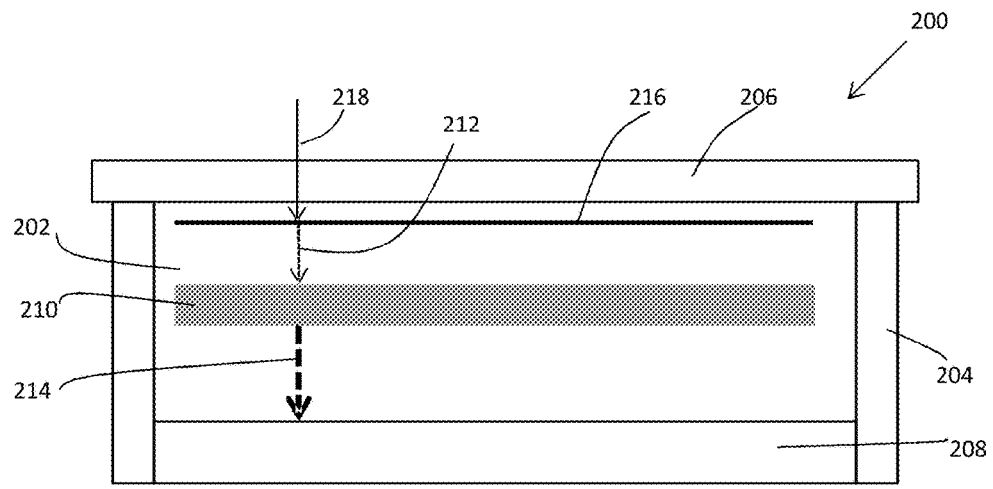
FIG. 2 is a schematic representation of an electron multiplier according to the prior art.

FIG. 1 shows a detector 100 for use in an electron multiplier 200 in accordance with one embodiment. Elements of the detector 100 are provided within the body of the rear cover 208 of the chamber 202.

In the current embodiment, the detector 100 comprises a substrate layer 102. A first side 110 of the substrate layer 102 is arranged to be provided within the chamber 202 and hence within the vacuum. The opposite side 108 is arranged outside the chamber 202.

A resistive layer 122 is provided over the vacuum side 110 of the substrate layer 102. The resistive layer 122 functions as a charge collector. An electron avalanche 214 incident on the resistive layer 122 causes a charge build up in the insulting layer 122.

Anode plates 104a-d are embedded within the substrate layer 102, to form an anode 104 for the detector 100. The anode 104 should be spaced from the resistive layer 122 such that the charge collected as a result of the electron avalanche 214 capacitively induces an image charge on the anode plates 104.

Conduit contacts 106a-d passing through the substrate layer 102 electrically connect the anode plates 104 to rear contacts 112a-d provided on the non-vacuum side 108 of the substrate 102. Each anode plate 104a-d and its associated conduit contact 106a-d and rear contact 108a-d are electrically isolated from the other anode plates 104a-d and contacts 106a-d, 108a-d. Therefore, the image charge induced on each anode plate 104 can be read out from the respective rear face contact 112.

The substrate layer 102 and resistive layer 122 (alone or in combination) are used to provide the rear cover 208 of the vacuum chamber 202. In this way, the capacitive coupling can be optimized, without having to provide complicated contacts through the walls of the chamber 202.

Read-out circuitry 114 is electrically coupled to the rear face contacts 112. The read-out circuitry 114 includes read-out contacts 116a-d and a processor (not shown). Each read-out contact 116 is arranged to detect the charge from a single rear face contact 112 and forward the charge to the processor. The processor analyses the measured charges to determine the location of the quanta 218 or particle that initiated the electron avalanche 214.

The processor is able to differentiate between charges provided by the different anode plates 104. The processor includes information correlating each anode plate 104 to its location. When a quanta or particle 218 is incident directly over the center of an anode plate 104, the spreading of the charge from the electron avalanche 214 is such that the image charge is only induced in a single anode plate 104. When the quanta or particle is incident over the periphery of an anode plate 104, or between anode plates 104, the image charge will be induced in neighboring anode plates 104. The processor is able to compare the charge induced in neighboring anode plates 104 to determine the location of the quanta or particle 218.

In this way, the detector 100 is able to detect and locate quanta or particle 218 strike events that are simultaneous or near simultaneous, and located in close proximity, provided the quanta or particles 218 do not induce an image charge on one or more common anode plates 104.

In the current embodiment, the substrate layer 102 is formed by a layered structure. A ceramic layer 118 is provided at the non-vacuum side 108 of the substrate 102. The anode plates 104 are provided such that they are partially embedded in the ceramic layer 118 and partially project from the ceramic layer 118. A layer of dielectric material 120 is provided over the anode plates 104. The resistive layer 122 is then provided over the dielectric.

To achieve the desired charge collecting performance, the resistive layer 122 should have a minimum sheet resistance of 250 kohm/square. In one example, the resistive layer has a sheet resistance of 500 kohm/square. In another example, the resistive layer has a sheet resistance of 750 kohm/square or 1 Mohm/square.

It will be appreciated that although FIG. 1 only shows a single row of anode plates, the anode plates 104 can be of any suitable size. There may be any number of anode plates 104 (one or more), and the anode plates 104 may also be of any shape and arranged in any suitable pattern, with any suitable spacing between anode plates 104. For example, the anode plates may be square or circular and arranged in a square grid or in concentric circles. In general, the smaller the anode plates 104 and the closer the spacing, the better the spatial resolution of the detector 100.

In some embodiments, the size of the anode plates 104 may be such that an image charge is induced on multiple plates 104, no matter where the electron avalanche 214 is absorbed by the resistive layer 122. In such embodiments, the signals from neighboring plates 104 are processed accordingly.

The ceramic layer 118, dielectric layer 120 and resistive layer 122 can be made from any suitable materials.

The minimum spacing of the anode plates 104 from the resistive layer 122 is dependent on the resistive material 122, dielectric material 120 and size of the anode plates 104. In one example, the anode plates 104 may be 0.5 mm from the resistive layer 122. This may be provided by a 0.5 mm thick dielectric layer.

The anode plates 104 may be buried at any suitable position within the layered structure of the substrate 102. For example, they may be encased within the dielectric layer 120.

In other embodiment, the substrate 102 may comprise a single material that achieves the desired capacitive performance and is able to form the rear cover 208 of the chamber 202.

It will be appreciated that no matter what the structure of the substrate layer 102, the overall thickness of the substrate layer 102 can be any suitable value to obtain the desired vacuum in the chamber 202. In one example, the substrate 102 may be 2 mm thick.

It will be appreciated that, although the embodiment shown in FIG. 1 shows rear contacts 112 provide on the non-vacuum face 108 of the substrate layer, the contacts 112 may be provided any suitable way. For example, they may be partially or wholly recessed into the non-vacuum face 108 of the substrate 102. In some embodiments, the rear face contacts may be omitted altogether and the read-out contacts 116 may couple directly to the conduit contacts 106.

It will also be appreciated that any suitable read-out circuitry 114 may be used to detect and process the charges on the anode plates 104.

The detector 100 described above may be used in any suitable type of electron multiplier 200. It will also be appreciated that the same principle can be applied to detect any other form of charge.

It will further be appreciated that features which are described in different embodiments may be combined in a single embodiment. Similarly, where several features are described in combination in a single embodiment, such features may also be provided separately or in suitable sub-combinations.

It is claimed:

1. A detector for an electron multiplier comprising:
    a substrate comprising a dielectric material, the substrate having a first face and an opposing second face;
    a charge collector provided adjacent the first face of the substrate;
    an anode within the substrate, the anode spaced from the first face, such that the anode is capacitively coupled to the charge collector, so that charge incident on the charge collector generates an image charge on the anode; and
    a conduit contact, coupled to the anode and passing through the substrate to the second face of the substrate.

2. A detector as claimed in claim 1, wherein the dielectric material of the substrate comprises a dielectric layer forming the first face.

3. A detector as claimed in claim 2, wherein the anode is provided within the dielectric layer or at the edge of the dielectric layer.

4. A detector as claimed in claim 2, wherein the substrate comprises a ceramic layer forming the second face.

5. A detector as claimed in claim 4, wherein the anode is provided at the interface between the ceramic layer and the dielectric layer.

6. A detector as claimed in claim 1, wherein the spacing between the first face of the substrate and the anode is at most 1 mm.

7. A detector as claimed claim 1, wherein the conduit contact comprises a via portion passing through the substrate and a planar portion, on the second face of the substrate.

8. A detector as claimed in claim 1, comprising circuitry, coupled to the conduit contact, the circuitry arranged to read-out the image charge induced in the anode and comprising a processor arranged to determine the position of an electron avalanche incident on the charge collector, based on the detected charge.

9. A detector as claimed in claim 1, wherein the anode comprises a plurality of electrically isolated anode plates.

10. A detector as claimed in claim 9, wherein each anode plate is coupled to a separate conduit contact, and wherein the circuitry is further arranged to separately readout the image charge from each anode plate.

11. A detector as claimed in claim 10, wherein the circuitry is further arranged to readout the image charge induced in at least two anode plates simultaneously.

12. A detector as claimed in claim 10, wherein the processor is arranged to:
    compare the image charge simultaneously induced in neighboring anode plates; and
    determine the position of an electron avalanche incident on the charge collector based on the comparison.

13. A detector as claimed in claim 1, wherein the charge collector is a resistive layer.

14. A detector as claimed in claim 13, wherein the resistive layer has a sheet resistance of at least 250 kohm/square.

15. An electron multiplier comprising:
    means for initiating an electron avalanche in response to a single detected electron, the electron avalanche emitted in the same location as the single electron is detected; and a detector for detecting the electron avalanche and determining the position of the single electron from the detected position of the electron avalanche, the detector comprising:
- a substrate comprising a dielectric material, the substrate having a first face and an opposing second face;
- a charge collector provided adjacent the first face of the substrate;
- an anode within the substrate, the anode spaced from the first face, such that the anode is capacitively coupled to the charge collector, so that charge incident on the charge collector generates an image charge on the anode; and
- a conduit contact, coupled to the anode and passing through the substrate to the second face of the substrate.

16. The electron multiplier as claimed in claim 15, comprising a measurement chamber holding the means for initiating an electron avalanche in a vacuum.

17. The electron multiplier as claimed in claim 16, wherein the chamber is defined by a housing, the substrate forming at least part of the housing, such that the charge collector is held in the vacuum and the second face of the substrate is held outside the vacuum.

18. The electron multiplier as claimed in claim 15, further comprising:
- an electron converter having a first face and an opposing second face, the electron converter, arranged to receive a photon or other quanta at a first location on the first face, and, in response to a received photon or quanta, emit an electron from the first location on the second face, the electron emitted towards the means for initiating an electron avalanche.

* * * * *